United States Patent
Kim et al.

(10) Patent No.: US 10,177,353 B2
(45) Date of Patent: Jan. 8, 2019

(54) RECHARGEABLE BATTERY MODULE

(71) Applicant: SAMSUNG SDI CO., LTD., Yongin-si, Gyeonggi-do (KR)

(72) Inventors: Young-Deok Kim, Yongin-si (KR); Ji-Soon Lim, Yongin-si (KR); Shi-Dong Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/340,861

(22) Filed: Nov. 1, 2016

(65) Prior Publication Data
US 2017/0125753 A1    May 4, 2017

(30) Foreign Application Priority Data
Nov. 2, 2015 (KR) .................. 10-2015-0153145

(51) Int. Cl.
*H01M 2/20* (2006.01)
*H01M 2/22* (2006.01)
(Continued)

(52) U.S. Cl.
CPC ....... *H01M 2/1022* (2013.01); *H01M 2/1061* (2013.01); *H01M 2/1072* (2013.01);
(Continued)

(58) Field of Classification Search
None
See application file for complete search history.

(56) References Cited

U.S. PATENT DOCUMENTS

2012/0114999 A1* 5/2012 Park .................. H01M 2/0434
429/99
2013/0022859 A1   1/2013 Lim
(Continued)

FOREIGN PATENT DOCUMENTS

EP    2 479 819 A2    7/2012
JP    WO 2013/084941   *   6/2013  ............. H01M 2/10
(Continued)

OTHER PUBLICATIONS

Extended European Search Report dated Jan. 18, 2017 for European Patent Application No. EP 16 196 604.9, which corresponds to subject U.S. Appl. No. 15/340,861.

*Primary Examiner* — Yoshitoshi Takeuchi
(74) *Attorney, Agent, or Firm* — Knobbe Martens Olson & Bear LLP

(57) ABSTRACT

A rechargeable battery module is disclosed. In one aspect, the battery module includes a plurality of unit cells including first and second outermost unit cells disposed at first and second opposing ends of the unit cells arranged in a first direction, wherein the unit cells have top and bottom surfaces opposing each other. The battery module also includes a bus bar holder covering the top surface of the unit cells, a bus bar disposed at the bus bar holder to electrically connect the unit cells and a pair of end plates respectively supporting the first and second outermost unit cells. The battery module further includes a pair of side plates disposed at third and fourth opposing ends of the unit cells arranged in a second direction crossing the first direction, wherein the side plates are connected to the end plates and the bus bar holder.

17 Claims, 6 Drawing Sheets

(51) Int. Cl.
*H01M 2/10* (2006.01)
*H01M 10/04* (2006.01)

(52) U.S. Cl.
CPC ......... *H01M 2/1077* (2013.01); *H01M 2/202* (2013.01); *H01M 2/204* (2013.01); *H01M 2/206* (2013.01); *H01M 10/04* (2013.01); *H01M 2220/20* (2013.01); *H01M 2220/30* (2013.01)

(56) References Cited

U.S. PATENT DOCUMENTS

| | | | |
|---|---|---|---|
| 2013/0189549 A1* | 7/2013 | Nemoto | H01M 10/482 429/7 |
| 2014/0030566 A1* | 1/2014 | Lee | H01M 2/1016 429/90 |
| 2014/0335393 A1* | 11/2014 | Wada | H01M 2/1077 429/121 |
| 2015/0295214 A1 | 10/2015 | Cho et al. | |

FOREIGN PATENT DOCUMENTS

| | | |
|---|---|---|
| KR | 20-2012-0005517 U | 7/2012 |
| KR | 10-1271883 B1 | 5/2013 |

\* cited by examiner

RECHARGEABLE BATTERY MODULE

RELATED APPLICATIONS

This application claims priority to and the benefit of Korean Patent Application No. 10-2015-0153145 filed in the Korean Intellectual Property Office on Nov. 2, 2015, the entire contents of which are incorporated herein by reference.

BACKGROUND

Field

The described technology generally relates to a rechargeable battery module.

Description of the Related Technology

Unlike a primary battery, a rechargeable battery can be repeatedly charged and discharged. Low-power rechargeable batteries are used in small portable electronic devices such as mobile phones, laptop computers, and camcorders, while high-power rechargeable batteries are used as a power source for driving motors of a hybrid vehicle, an electric vehicle, and the like.

The rechargeable battery can be used as a single cell as in small electronic devices, or can be used as a battery module in which multiple cells are electrically connected (as in the power sources for driving a motor) and as a battery pack in which multiple battery modules are electrically connected.

The above information disclosed in this Background section is only to enhance the understanding of the background of the described technology and therefore it may contain information that does not form the prior art that is already known in this country to a person of ordinary skill in the art.

SUMMARY OF CERTAIN INVENTIVE ASPECTS

One inventive aspect relates to a rechargeable battery module which accommodates a plurality of unit cells in a space set by a side plate and an end plate and is covered by a bus bar holder.

Another aspect is a rechargeable battery module that is strong against a mechanical impact by strengthening fastening forces a side plate and a bus bar holder.

Another aspect is a rechargeable battery module, including: unit cells configured to be arranged in a first direction; a bus bar holder configured to cover the unit cells; a bus bar configured to be disposed at the bus bar holder to electrically connect the unit cells; a pair of end plates configured to be provided at opposite ends of the first direction to support an outermost unit cell; and a side plate configured to be provided at opposite ends of a second direction crossing the first direction to be connected to the end plate and to be combined with the bus bar holder.

The bus bar holder and the side plate may have a fastening force in at least one of the second direction and a third direction crossing the second direction.

The bus bar holder may include a bracket that is made of a synthetic resin and is protruded in the opposite ends of the second direction.

The bracket may include a pair of legs installed at the bus bar holder, and a body connected to the side plate by connecting ends of the pair of legs to each other.

The bus bar holder may form a first gap between the leg and an installing groove by forming the installing groove around the bracket.

The body may form a second gap between facing surfaces of the installing groove.

A plurality of the brackets may be provided, and the plurality of the brackets may be disposed by a predetermined interval along the first direction in the bus bar holder.

The side plate may include a connecting portion that is disposed at a predetermined interval along the first direction in the side plate so as to correspond to the bracket of the bus bar holder and is welded to the body of the bracket.

The connecting portion may include an elastic portion bent at a lower side of the connecting portion to have an elastic force toward the bracket.

The side plate may include a coupling portion coupled with a coupling groove that is spaced apart in the third direction from the opposite ends of the second direction of the bus bar holder and is formed along the first direction.

The bus bar holder may be provided with a coupling inducement groove that is formed to have a concave shape toward the unit cell from a lower side of the coupling portion to induce coupling with the unit cell.

The rechargeable battery module may further include a buffer member interposed between the coupling inducement groove and the unit cell of the bus bar holder.

The side plate may include a flange that is bent in the second direction from an end of a lower side of the third direction crossing the first direction and the second direction to support the unit cells.

The flange may include a rib that is protruded in the third direction and is extended in the first direction.

The end plate may include an end support that is provided between the end plate and the outermost unit cell and is made of an electrical insulating material.

Another aspect is a rechargeable battery module, comprising: a plurality of unit cells including first and second outermost unit cells disposed at first and second opposing ends of the unit cells arranged in a first direction, wherein the unit cells have top and bottom surfaces opposing each other; a bus bar holder covering the top surface of the unit cells; a bus bar disposed at the bus bar holder to electrically connect the unit cells; a pair of end plates respectively supporting the first and second outermost unit cells; and a pair of side plates disposed at third and fourth opposing ends of the unit cells arranged in a second direction crossing the first direction, wherein the side plates are connected to the end plates and the bus bar holder.

In the above battery module, the bus bar holder and the side plates have a fastening force in at least one of the second direction and a third direction crossing the second direction. In the above battery module, the bus bar holder includes a bracket that is made of a synthetic resin and extends in the second direction. In the above battery module, the bracket includes a pair of legs installed at the bus bar holder, and a body having first and second surfaces opposing each other, wherein the first surface of the body is connected to the side plates and wherein the second surface of the body interconnects the legs.

In the above battery module, the bus bar holder forms a first gap between the legs and an installing groove formed around the bracket. In the above battery module, the body forms a second gap between facing surfaces of the installing groove. The above battery module further comprises a plurality of brackets spaced apart along the first direction in the bus bar holder. In the above battery module, each of the side plates includes a connecting portion that is spaced apart along the first direction in the side plate so as to correspond to the brackets of the bus bar holder and is welded to the bodies of the brackets. In the above battery module, the connecting portion includes an elastic portion bent at a lower side of the connecting portion to have an elastic force toward the brackets.

In the above battery module, each of the side plates includes a coupling portion inserted into a coupling groove, in the second direction, formed in the bus bar holder. In the above battery module, the bus bar holder has a coupling inducement groove that is concave toward the unit cells from a lower side of the coupling portion so as to induce coupling with the unit cells. The above battery module further comprises: a buffer member interposed between the coupling inducement groove of the bus bar holder and the unit cells. In the above battery module, each of the side plates includes a flange that is bent and formed on the bottom surface of the unit cells to support the unit cells.

In the above battery module, the flange includes a rib extending toward and contacting the bottom surface of the unit cells. In the above battery module, each of the end plates includes an end support that is configured to support one of the first and second outermost unit cells and is made of an electrical insulating material. In the above battery module, each of the side plates includes a stepped structure. In the above battery module, each of the side plates is longer than each of the end plates.

Another aspect is a rechargeable battery module, comprising: a plurality of unit cells arranged in a first direction to form a battery module, wherein the battery module includes top and bottom surfaces opposing each other, and a side surface interposed between the top and bottom surfaces; a bus bar holder covering the top surface of the battery module; a bus bar disposed at the bus bar holder to electrically connect the unit cells of the battery module; a pair of end plates disposed at first and second opposing sides of the side surface of the battery module; and a pair of side plates disposed at third and fourth opposing sides of the side surface of the battery module, wherein the side plates are connected to the end plates and the bus bar holder, and wherein the end plates and the side plates surround the side surface of the battery module.

In the above battery module, each of the side plates includes a stepped structure. In the above battery module, each of the side plates includes a flange that is bent and formed on the bottom surface of the battery module to support the unit cells.

According to at least one of the disclosed embodiments, the side plate is connected to the end plate and is combined with the bus bar holder, thereby effectively strengthening the fastening forces of the side plate and the bus bar holder. That is, the bus bar holder and the side plate are combined in the second direction (y-axis direction) and/or the third direction (z-axis direction) to have a mutual fastening force, thereby effectively protecting the rechargeable battery module from the mechanical impact.

DETAILED DESCRIPTION OF CERTAIN INVENTIVE EMBODIMENTS

Figure 1:
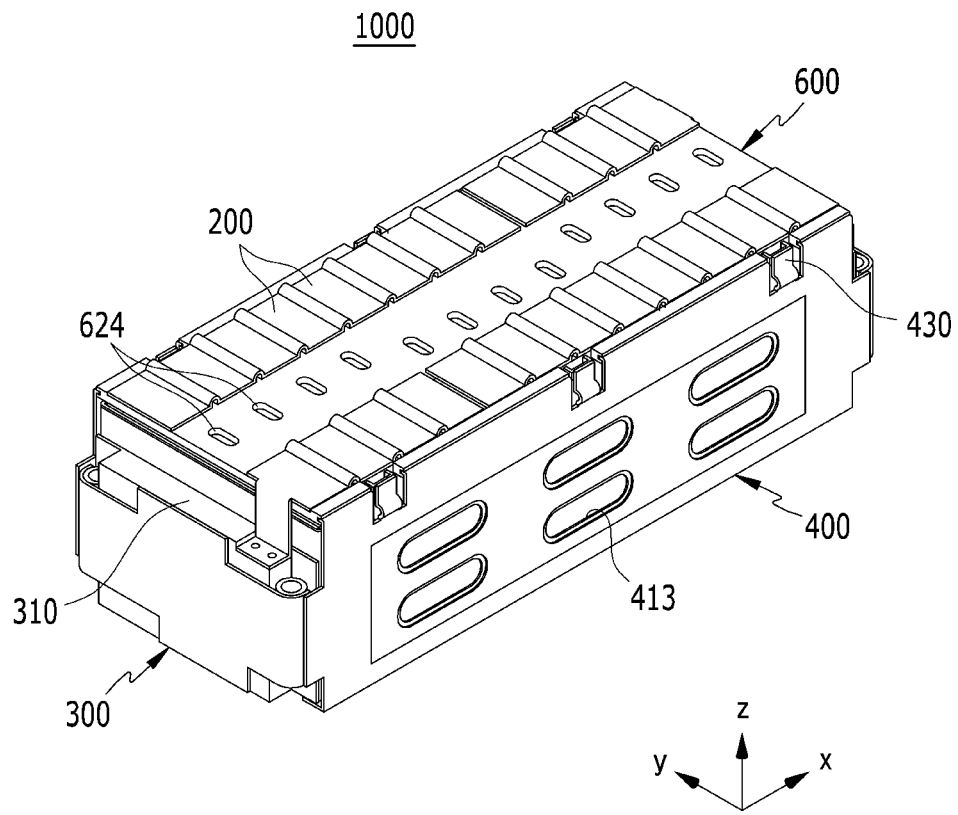
FIG. 1 illustrates a perspective view of a rechargeable battery module according to an exemplary embodiment.

Generally, a rechargeable battery module is formed by arranging multiple unit cells in one direction (e.g., x-axis direction), and placing end plates at opposite ends of the arranged direction of the unit cells. Side plates are placed at opposite sides of the arranged direction, the side plates are welded to the end plate, and the unit cells are covered by a bus bar holder. Since the side plates are formed to extend more than the end plates (to correspond to the length dimension of the unit cells), they do not strongly fasten to the unit cells and the bus bar holder in respective y-axis and a z-axis directions. Thus, a rechargeable battery module is highly vulnerable to mechanical impact (or shock) applied in these directions.

Embodiments will be described more fully hereinafter with reference to the accompanying drawings. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
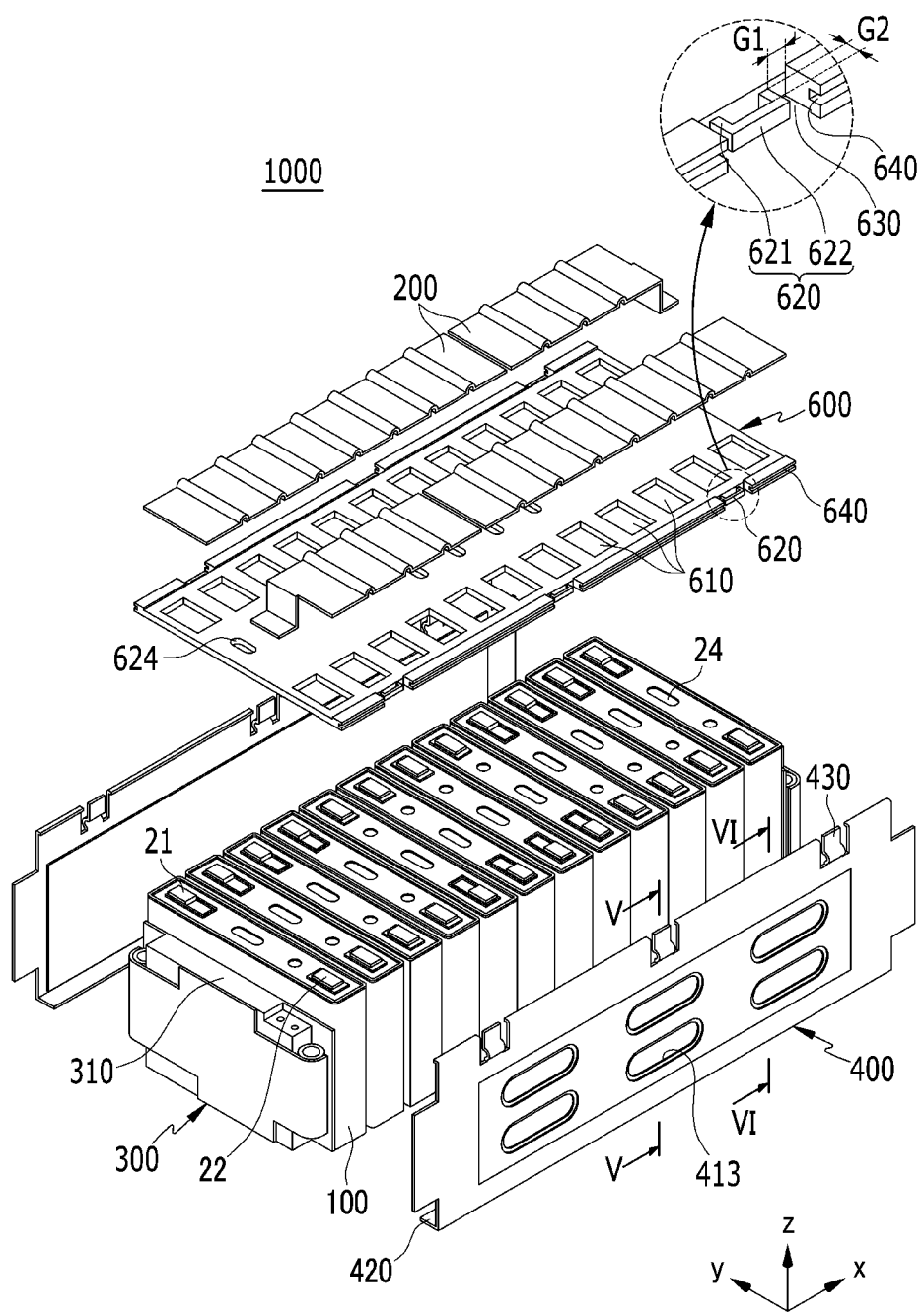
FIG. 2 illustrates an exploded perspective view of a rechargeable battery module applied to FIG. 1.

FIG. 1 illustrates a perspective view of a rechargeable battery module 1000 according to an exemplary embodiment, and FIG. 2 illustrates an exploded perspective view of the rechargeable battery module 1000 applied to FIG. 1.

Referring to FIGS. 1 and 2, the rechargeable battery module includes unit cells 100 including rechargeable batteries, a bus bar holder 600 covering the unit cells 100, a bus bar 200 that is disposed in a bus bar holder 600 and is electrically connected to unit cells 100, and an end plate 300 and a side plate 400 supporting and accommodating the unit cells 100.

The unit cells 100 are disposed to be adjacent to each other in a first direction (x-axis direction), and are electrically and structurally connected to each other to form the rechargeable battery module. The bus bar holder 600 is disposed on an upper portion of the unit cells 100 to cover the unit cells 100.

The bus bar 200 is disposed outside of the bus bar holder 600 to be electrically connected to the unit cells 100. For example, the bus bar 200 connects four adjacent unit cells 100 in parallel in the rechargeable battery module, and connects the four unit cells 100 connected in parallel to adjacent four unit cells 100 connected in parallel in series.

A pair of end plates 300 are provided and disposed at opposite ends of the x-axis direction to support each of outermost unit cells 100. For example, the end plate 300 supports the unit cells 100 by interposing an end support 310 inside opposite ends of a length direction (x-axis direction) of the rechargeable battery module.

The end plate 300 can be formed of a metal material, for example, of stainless steel to provide strength for a rechargeable battery module at an outermost side of the x-axis direction. The end support 310 can be formed of an electric insulator, and supports the unit cell 100 to electrically insulate the end plate 300 and the unit cell 100.

A pair of side plates 400 are provided, and are disposed at opposite ends of a second direction (y-axis direction) crossing the x-axis direction to be connected to the end plates 300, thereby maintaining a gap (G) (refer to FIG. 5) spaced apart from the unit cells 100.

For example, the side plate 400 accommodates and supports the unit cells 100 at opposite sides of a width direction (y-axis direction) of the rechargeable battery module. The side plate 400 has a stepped structure that is formed within a range of the gap (G).

The end plate 300 and the side plate 400 can be connected to each other by welding, and the side plate 400 is combined with the bus bar holder 600. The end plate 300, the side plate 400, and the bus bar holder 600 set a space in the inside of each other to support and accommodate the unit cells 100.

In addition, the bus bar holder 600 is provided with a bus bar hole 610 for connecting the bus bar 200 and the unit cell 100. Accordingly, the bus bar 200 that is disposed outside of the bus bar holder 600 may be electrically connected to the unit cells 100 through the bus bar hole 610.

In this case, the bus bar holder 600 and the side plate 400 have a fastening force in at least one of the second direction (y-axis direction) and a third direction (z-axis direction). The bus bar holder 600 and the side plate 400 described in the present exemplary embodiment are formed to have the fastening forces of the y-axis and z-axis directions, and are combined with each other. Thus, the rechargeable battery module may be effectively protected from a mechanical impact applied in the y-axis and z-axis directions.

Figure 3:
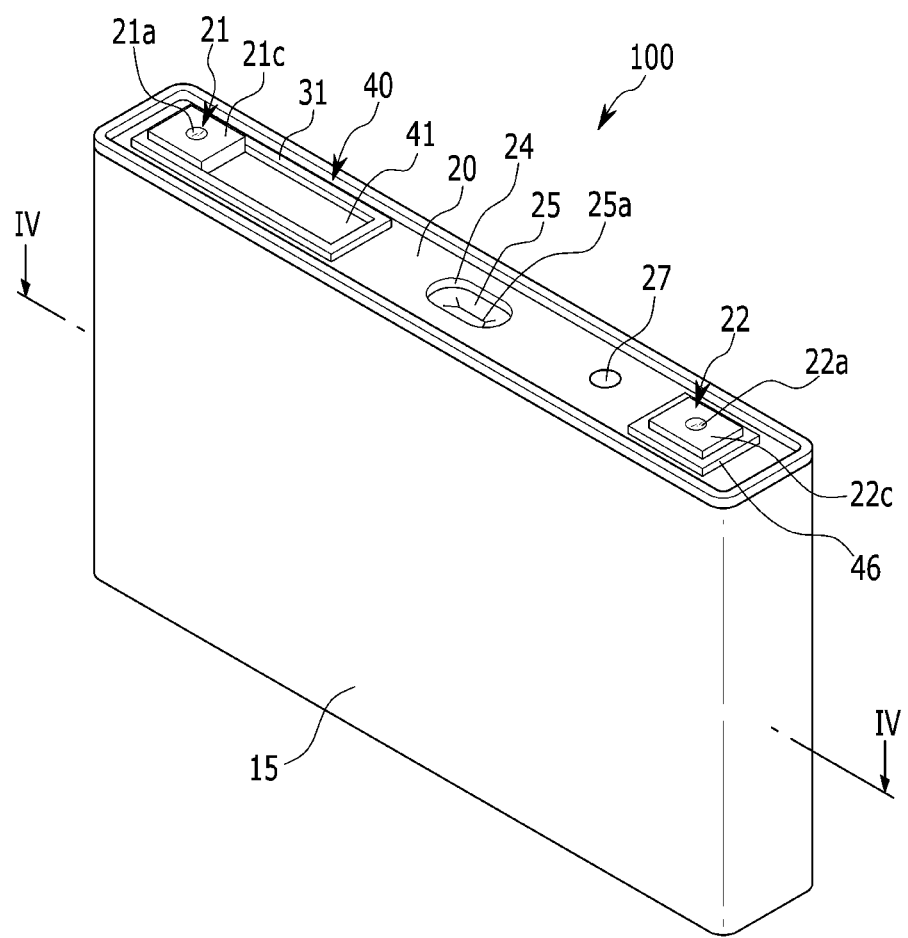
FIG. 3 illustrates a perspective view of a rechargeable battery applied to FIG. 2.
Figure 4:
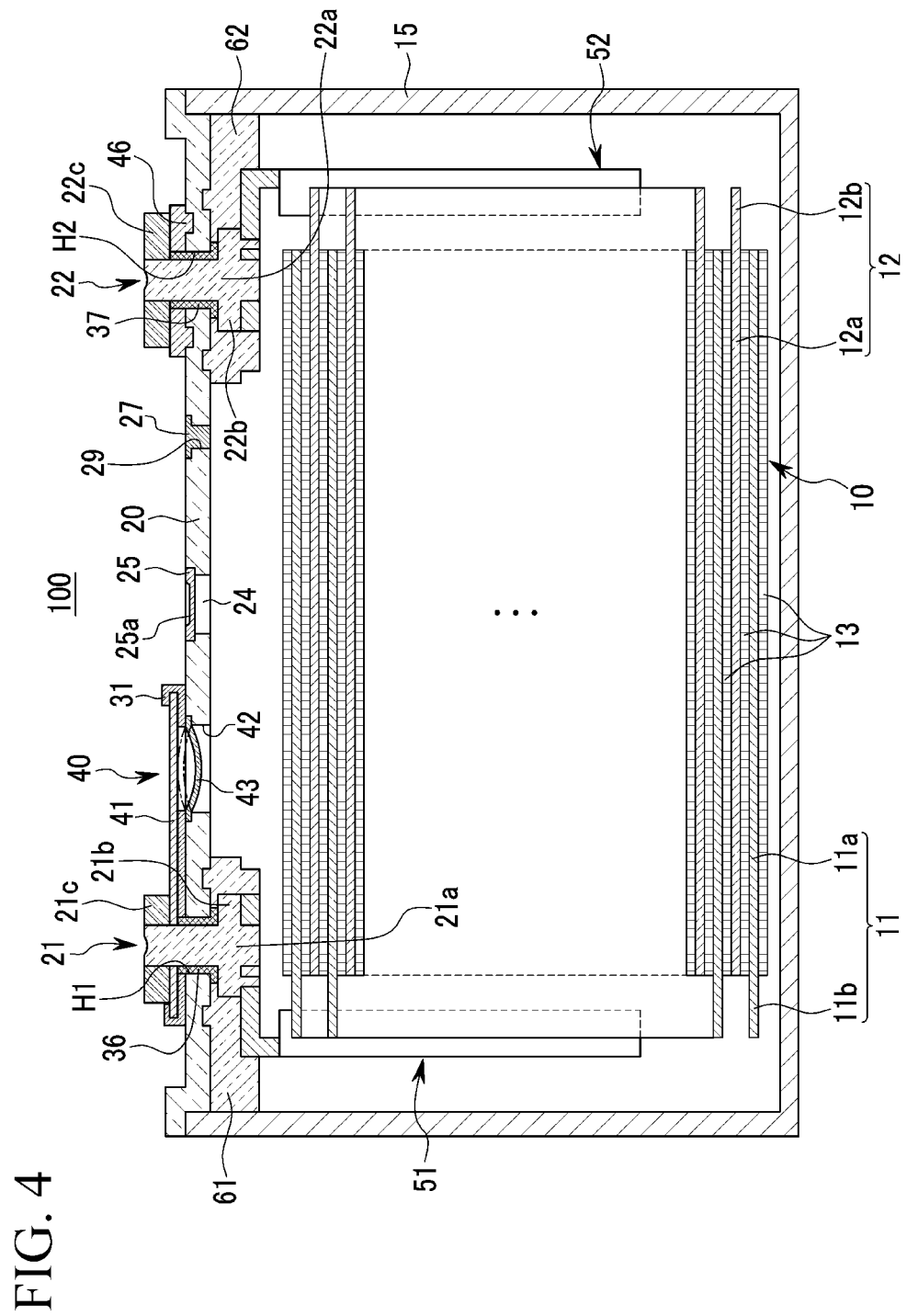
FIG. 4 illustrates a cross-sectional view taken along line IV-IV of FIG. 3.

FIG. 3 illustrates a perspective view of a rechargeable battery applied to FIG. 2, and FIG. 4 illustrates a cross-sectional view taken along line IV-IV of FIG. 3. Referring to FIGS. 3 and 4, the unit cell 100 is formed as a rechargeable battery charging and discharging a current.

The unit cell 100 includes an electrode assembly 10, a case 15 that accommodates the electrode assembly 10, a cap plate 20 that is combined to an opening of the case 15, a first electrode terminal 21 (hereinafter, referred to as "negative terminal") and a second electrode terminal 22 (hereinafter, referred to as "positive terminal") at the cap plate 20, and an external short-circuit portion 40 provided at the negative terminal 21.

For example, a first electrode 11 (hereinafter, referred to as "negative electrode") and a second electrode 12 (hereinafter, referred to as "positive electrode") 12 are disposed at opposite sides of a separator 13, which is an insulator. Furthermore, the negative electrode 11, the separator 13, and the positive electrode 12 are spirally wound in a jelly-roll state to form the electrode assembly 10.

The negative electrode 11 and the positive electrode 12 respectively include coated regions 11a and 12a where an active material is coated on current collectors made of a metal plate, and an uncoated regions 11b and 12b where an active material is not coated thereon and which are formed as exposed current collectors.

The uncoated region 11b of negative electrode 11 is formed at one end portion of the negative electrode 11 along the spirally-wound negative electrode 11. The uncoated region 12b of the positive electrode 12 is formed at one end portion of the positive electrode 12 along the spirally-wound positive electrode 12. Thus, the uncoated regions 11b and 12b are respectively disposed at opposite end portions of electrode assembly 10.

For example, the case 15 substantially formed as a cuboid in which a space for accommodating the electrode assembly 10 and an electrolyte solution is set, and is formed with the opening for connecting inner and outer spaces at one side of the cuboid. The opening allows the electrode assembly 10 to be inserted into the case 15.

The cap plate 20 is installed at the opening of the case 15 to seal the opening of the case 15. For example, the case 15 and the cap plate 20 are formed of aluminum to be able to be welded to each other.

In addition, the cap plate 20 is provided with an electrolyte injection opening 29, a vent hole 24, and terminal holes H1 and H2. The electrolyte injection opening 29 allows the electrolyte solution to be injected into the case 15 after combining the case 15 with the cap plate 20. After injecting the electrolyte solution, the electrolyte injection opening 29 is sealed by a sealing cap 27.

The vent hole 24 is sealed by a vent plate 25 so as to discharge internal pressure of the unit cell 100. When the internal pressure of the unit cell 100 reaches a predetermined pressure, the vent plate 25 is ruptured to open the vent hole 24. The vent plate 25 is provided with a notch 25a that induces the rupture.

Referring to FIGS. 1 and 2, the bus bar holder 600 further includes a holder vent hole 624 corresponding to the vent hole 24. Accordingly, the internal pressure discharged through the vent hole 24 can be discharged out of the rechargeable battery module through the holder vent hole 624. For example, the internal pressure discharged through the vent hole 24 is not disturbed by the bus bar holder 600.

Again referring to FIG. 3 and FIG. 4, the negative terminal 21 and the positive terminal 22 are respectively installed at the terminal holes H1 and H2 of the cap plate 20, and are electrically connected to the electrode assembly 10. For instance, the negative terminal 21 is electrically connected to the negative electrode 11 of electrode assembly 10, and the positive terminal 22 is electrically connected to the positive electrode 12 of electrode assembly 10. Accordingly, the electrode assembly 10 is drawn out of the case 15 through the negative and positive terminals 21 and 22.

Since the negative and positive terminals 21 and 22 have the same structure inside of the cap plate 20, the same structure will be described together, and since they have different structures from each other outside of the cap plate 20, the different structures will be separately described.

The negative and positive terminals 21 and 22 include rivet terminals 21a and 22a that are respectively installed at the terminal holes H1 and H2 of the cap plate 20, flanges 21b and 22b that are widely formed inside of the cap plate 20 while being integrally formed with the rivet terminals 21a and 22a. The negative and positive terminals 21 and 22 also include plate terminals 21c and 22c that are connected to the rivet terminals 21a and 22a by being riveted or welded while being disposed outside of the cap plate 20.

Negative and positive electrode gaskets 36 and 37 are respectively provided between the rivet terminals 21a and 22a of the negative and positive terminals 21 and 22 and the inner sides of the terminal holes H1 and H2 to seal and electrically insulate between the rivet terminals 21a and 22a of the negative and positive terminals 21 and 22 and the cap plate 20.

The negative and positive electrode gaskets 36 and 37 are provided so that they are further extended between the flanges 21b and 22b and the inner side of the cap plate 20, and further seal and electrically insulate between the flanges 21b and 22b and the cap plate 20. Accordingly, by installing the negative and positive terminals 21 and 22 at the cap plate 20, the negative and positive electrode gaskets 36 and 37 prevent the electrolyte solution from leaking through the terminal holes H1 and H2.

Negative and positive electrode lead tabs 51 and 52 allow the negative and positive terminals 21 and 22 to be electrically connected to the negative and positive electrodes 11 and 12 of the electrode assembly 10, respectively. For example, by combining the negative and positive electrode lead tabs 51 and 52 with lower end portions of the rivet terminals 21a and 22a and then caulking the lower end portions, the negative and positive electrode lead tabs 51 and 52 are supported by the flanges 21b and 22b and are connected to the lower end portions of the rivet terminals 21a and 22a.

Negative and positive insulating members 61 and 62 are respectively installed between the negative and positive electrode lead tabs 51 and 52 and the cap plate 20 to electrically insulate therebetween. In addition, the negative and positive insulating members 61 and 62 are combined to the cap plate 20 at one side thereof, and enclose the negative and positive electrode lead tabs 51 and 52, the rivet terminals 21a and 22a, and the flanges 21b and 22b at the other thereof, thereby stabilizing a connecting structure between them.

The external short-circuit portion 40 will be described in connection with the plate terminal 21c of the negative terminal 21, and a top plate 46 will be described in connection with the plate terminal 22c of the positive terminal 22.

The external short-circuit portion 40 adjacent to the negative terminal 21 includes a short-circuit tab 41 and a short-circuit member 43 that are separated or short-circuited depending on the internal pressure of the unit cell 100. The short-circuit tab 41 is disposed outside of the cap plate 20 while being electrically connected to the rivet terminal 21a of the negative terminal 21 and interposing an insulating member 31.

The insulating member 31 is disposed between the short-circuit tab 41 and the cap plate 20 to electrically insulate the short-circuit tab 41 from the cap plate 20. For example, the cap plate 20 maintains an electrically insulated state with the negative terminal 21.

By combining the short-circuit tab 41 and the plate terminal 21c with an upper end portion of the rivet terminal 21a and then caulking the upper end portion of the rivet terminal 21a, the short-circuit tab 41 and the plate terminal 21c are combined with the upper side of the rivet terminal 21a. Accordingly, the short-circuit tab 41 and the plate terminal 21c are fastened to the cap plate 20 while interposing the insulating member 31 therebetween.

The short-circuit member 43 is installed in a short-circuit hole 42 which is formed in the cap plate 20. The short-circuit tab 41 is connected to the negative terminal 21 and then extended along an outer side of the short-circuit member 43. Thus, the short-circuit tab 41 and the short-circuit member 43 correspond to the short-circuit hole 42, face each other to maintain a separated state therebetween (solid line state), and may form a short-circuit state (imaginary line state) in which the short-circuit member 43 is inversely deformed when the internal pressure of the unit cell 100 increases.

The top plate 46 adjacent to the positive terminal 22 electrically connects the plate terminal 22c of positive terminal 22 and the cap plate 20. For example, the top plate 46 is interposed between the plate terminal 22c and the cap plate 20, and is penetrated by the rivet terminal 22a.

Thus, by combining the top plate 46 and the plate terminal 22c with an upper end portion of the rivet terminal 22a and then caulking the upper end portion of the rivet terminal 22a, the top plate 46 and the plate terminal 22c are combined with the upper end portion of the rivet terminal 22a. The plate terminal 22c is disposed at the outside of the cap plate 20 in a state of interposing the top plate 46 therebetween.

Meanwhile, the positive electrode gasket 37 is installed such that it is further extended between the rivet terminal 22a and the top plate 46. For example, the positive electrode gasket 37 prevents the rivet terminal 22a and the top plate 46 from being directly electrically connected to each other. For example, the rivet terminal 22a is electrically connected to the top plated 46 through the plate terminal 22c.

Figure 5:
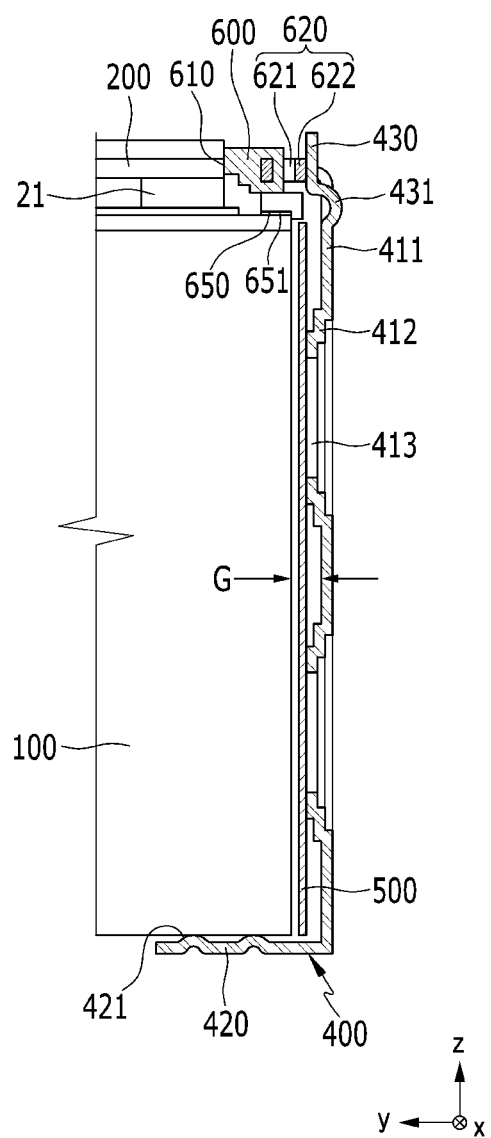
FIG. 5 illustrates a cross-sectional view taken along line V-V of FIG. 2.

FIG. 5 illustrates a cross-sectional view taken along line V-V of FIG. 2. Referring to FIG. 1, FIG. 2, and FIG. 5, in a rechargeable battery module of an exemplary embodiment, the bus bar holder 600 is formed of a synthetic resin material, and includes a bracket 620 protruded in opposite ends of the y-axis direction.

The bracket 620 may be formed of stainless steel that is the same material as the side plate 400. For instance, the bracket 620 may be provided at the bus bar holder 600 by insert injection molding.

In addition, the bracket 620 includes a pair of legs 621 installed at the bus bar holder 600 and a body 622 connecting end portions of the pair of legs 621. The body 622 may be connected to the side plate 400 by welding.

The bus bar holder 600 that is provided with the bracket 620 includes an installing groove 630 around the bracket 620. In this case, a first gap G1 (see FIG. 2) is formed between the leg 621 of the bracket 620 and the installing groove 630. Further, a second gap G2 (see FIG. 2) is formed between the body 622 and a facing surface of the installing groove 630.

Since the installing groove 630, the first gap G1, and the second gap G2, when the side plate 400 is welded to the bracket 620, mostly interrupts welding heat transmitted to the bracket 620, thermal deformation of the bus bar holder 600 due to the welding heat is prevented or minimized.

A plurality of brackets 620 are disposed at a predetermined gap along the x-axis direction in the bus bar holder 600. The side plate 400 is provided with a connecting portion 430 that is disposed at a predetermined gap along the x-axis direction to correspond to the bracket 620 of the bus bar holder 600.

For example, the body 622 of the bracket 620 is welded to the connecting portion 430 of the side plate 400. In this case, the installing groove 630 and the first and second gaps G1 and G2 provides a welding heat avoidance space for the body 622 of the bracket 620 and the connecting portion 430.

According to the body 622 of the bracket 620 and the welding of connecting portion 430, the bus bar holder 600 with the bracket 620 and the side plate 400 with the connecting portion 430 may have a strong fastening force in the y-axis direction, and may simultaneously have a fastening force in the z-axis direction.

The connecting portion 430 of the side plate 400 is further provided with an elastic portion 431 bent at a lower end portion thereof to have an elastic force toward the bracket. When the side plate 400 is combined with the bus bar holder 600, the connecting portion 430 is elastically supported to the bracket 620 by an elastic force of the elastic portion 431.

For example, component tolerances of the side plate 400 and the bus bar holder 600 may be absorbed by the elastic force of the elastic portion 431. When laser welding is performed, the connecting portion 430 and the bracket 620 closely contact each other, thereby ensuring welding usability and improving welding quality.

As such, due to the elastic force of the elastic portion 431, the absorption of the component tolerances and the improvement of the welding quality, the rechargeable battery module may be effectively protected from the mechanical impact applied in the y-axis direction thereof.

Figure 6:
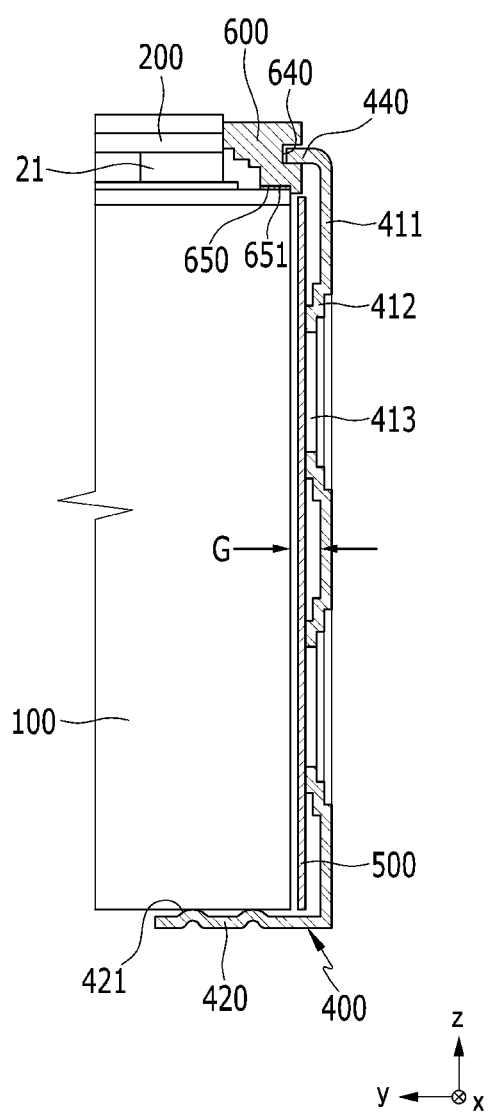
FIG. 6 illustrates a cross-sectional view taken along line VI-VI of FIG. 2.

FIG. 6 illustrates a cross-sectional view taken along line VI-VI of FIG. 2. Referring to FIG. 1, FIG. 2, and FIG. 6, in a rechargeable battery module of an exemplary embodiment, the bus bar holder 600 is spaced apart from the opposite ends of the y-axis direction to the z-axis direction, and a coupling groove 640 is formed along the x-axis direction. The side plate 400 is provided with a coupling portion 440 combined with the coupling groove 640.

Since the coupling portion 440 is combined with the coupling groove 640, a force fastening the side plate 400 and the bus bar holder 600 in the z-axis direction is formed. Accordingly, due to the fastening force of the z-axis direction, the rechargeable battery module may be effectively protected from the mechanical impact applied in the z-axis direction thereof.

In addition, the bus bar holder 600 is provided with a coupling inducement groove 650 that is concavely formed from a lower side of the coupling portion 440 toward the unit cell 100. The coupling inducement groove 650 induces combination between the unit cells 100 and the bus bar holder 600 when the unit cells 100 are covered with the bus bar holder 600.

The mechanical impact formed in the z-axis direction between the bus bar holder 600 and the unit cell 100 may be effectively absorbed, by the buffer member 651 between the coupling inducement groove 650 of the bus bar holder 600 and the unit cell being interposed.

Referring back to FIG. 5 and FIG. 6, the side plate 400 forms a stepped structure including a base 411 that is flatly formed at an outermost side of the second direction (y-axis direction and at least one protruding portion 412 that is protruded toward the unit cell 100 in the base 411. For example, the protruding portion 412 may gradually decrease and protrudes from the base 411 to the unit cell.

The base 411 and the protruding portion 412 form the stepped structure at a right angle. The side plate 400 is provided with a through-hole 413 in the protruding portion 412 adjacent to the unit cell 100. For example, the through-hole 413 is formed in an innermost protruding portion 412 to decrease weight of the side plate 400.

A plurality of through-holes 413 may be provided along the x-axis direction and the z-axis direction. The through-holes 413 may further decrease the weight of the side plate 400 while maintaining a hardness of the side plate 400.

The base 411 and a right angle connection structure of the protruding portion 412 are provided at each of the through-holes 413, thereby preventing a spring back of the side plate 400 formed of a thin plate. For example, the base 411 and the right angle connection structure of the protruding portion 412 may further strengthen the hardness of the side plate 400 that may be weakened due to the through hole 413.

The side plate 400 can be formed of a metal sheet of a thin plate with a predetermined thickness. For instance, the side plate 400 may be formed of stainless steel for a thin plate. In some embodiments, the base 411 and the right angle connection structure of the protruding portion 412 are formed in a predetermined area of the side plate 400 to extend an entire thickness of the y-axis direction within the gap (G), thereby maintaining a shape of the metal sheet of the thin plate.

An insulating sheet 500 may be further provided between the side plate 400 and the unit cells 100. The insulating sheet 500 electrically insulates the side plate 400 and the unit cells 100. In this case, a fine gap may be set between the insulating sheet 500 and the unit cells 100.

For example, the insulating sheet 500 is attached to the protruding portion 412 most adjacent to the unit cell 100 in the side plate 400. The insulating sheet 500 may be attached to the protruding portion 412 of the side plate 400 by a double-sided adhesive tape.

The side plate 400 further includes a flange 420 that supports the unit cells 100. The flange 420 can be bent toward the y-axis direction from a lower end of a third direction (z-axis direction) crossing the x-axis and y-axis directions.

In addition, the flange 420 further includes a rib 421 which protrudes in the z-axis direction and extends in the x-axis direction. As an example, the rib 421 is formed of a semi-circular shape with two lines on the flange 420, and stably supports the lower end portion of the unit cells 100.

The flange 420 allows a lower plate supporting the lower end portions of the unit cells 10 to be removed in the rechargeable battery module 1, thereby reducing the weight of the rechargeable battery module. Further, when the rechargeable battery module is installed in a system (e.g., an electric vehicle), the flange 420 allows the unit cells 100 to be directly adhered to a cooling device (not shown), thereby realizing effective cooling.

In addition, the side plate 400 is combined with the bus bar holder 600 that supports lower ends of the unit cells 100 with the flange 420 which is disposed at a lower end portion thereof and covers the unit cells 100 with the connecting portion 430 which is disposed at an upper end portion thereof.

For instance, the flange 420 of the side plate 400 and the connecting portion 430 form a fastening force of the z-axis direction with respect to the unit cells 100 and the bus bar holder 600. Thus, the fastening force of the z-axis direction may effectively protect the rechargeable battery module from the mechanical impact applied in the z-axis direction of the rechargeable battery module.

While the inventive technology has been described in connection with exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery module, comprising:
   a plurality of unit cells including first and second outermost unit cells disposed at first and second opposing ends of the plurality of unit cells, the plurality of unit cells arranged in a first direction, wherein each of the plurality of unit cells has top and bottom surfaces opposing each other;
   a bus bar holder covering the top surfaces of all the plurality of unit cells;
   a bus bar disposed directly on the bus bar holder to electrically connect the plurality of unit cells, wherein the bus bar holder has a plurality of bus bar holes, and wherein the bus bar is connected to the plurality of unit cells through the plurality of bus bar holes;
   first and second end plates respectively supporting the first and second outermost unit cells; and
   a pair of side plates disposed at third and fourth opposing ends of the plurality of unit cells, the side plates arranged in a second direction crossing the first direction, wherein the side plates are connected to the end plates and the bus bar holder,
   wherein the bus bar comprises a first bus bar directly connected to positive terminals of the plurality of unit cells and a second bus bar separated from the first bar and directly connected to negative terminals of the plurality of unit cells, wherein the rechargeable battery module further comprises a first end support placed between the first end plate and the first outermost unit cell and a second end support placed between the second end plate and the second outermost unit cell, wherein each of the first and second bus bars includes a downward extension formed on one end thereof, wherein the downward extension of the first bus bar is connected to the first end support, and wherein the downward extension of the second bus bar is connected to the second end support.

2. The rechargeable battery module of claim 1, wherein the bus bar holder and the side plates have a fastening force in at least one of the second direction and a third direction crossing the second direction.

3. The rechargeable battery module of claim 2, wherein each of the side plates includes a coupling portion inserted into a coupling groove, in the second direction, formed in the bus bar holder.

4. The rechargeable battery module of claim 3, wherein the bus bar holder has a coupling inducement groove that is concave toward the unit cells from a lower side of the coupling portion, the coupling inducement groove configured to induce coupling with the unit cells.

5. The rechargeable battery module of claim 4, further comprising:
a buffer member interposed between the coupling inducement groove of the bus bar holder and the unit cells.

6. The rechargeable battery module of claim 2, wherein each of the side plates includes a flange that is bent and formed on the bottom surface of the unit cells to support the unit cells.

7. The rechargeable battery module of claim 6, wherein the flange includes a rib extending toward and contacting the bottom surface of the unit cells.

8. The rechargeable battery module of claim 1, wherein the bus bar holder includes a bracket that is made of a synthetic resin and extends in the second direction.

9. The rechargeable battery module of claim 8, wherein the bracket includes a pair of legs installed at the bus bar holder, and a body having first and second surfaces opposing each other, wherein the first surface of the body is connected to the side plates and wherein the second surface of the body interconnects the legs.

10. The rechargeable battery module of claim 9, wherein the bus bar holder forms a first gap defined by an installing groove formed around the bracket.

11. The rechargeable battery module of claim 10, wherein the body forms a second gap between facing surfaces of the installing groove.

12. The rechargeable battery module of claim 8, further comprising a plurality of brackets spaced apart along the first direction in the bus bar holder.

13. The rechargeable battery module of claim 1, wherein each of the first and second end supports is made of an electrical insulating material.

14. The rechargeable battery module of claim 1, wherein each of the side plates includes a stepped structure.

15. The rechargeable battery module of claim 1, wherein each of the side plates is longer than each of the end plates.

16. A rechargeable battery module, comprising:
a plurality of unit cells including first and second outermost unit cells disposed at first and second opposing ends of the plurality of unit cells, the plurality of unit cells arranged in a first direction, wherein each of the plurality of unit cells has top and bottom surfaces opposing each other;
a bus bar holder covering the top surfaces of all the plurality of unit cells;
a bus bar disposed directly on the bus bar holder to electrically connect the plurality of unit cells, wherein the bus bar holder has a plurality of bus bar holes, and wherein the bus bar is connected to the plurality of unit cells through the plurality of bus bar holes;
a pair of end plates respectively supporting the first and second outermost unit cells;
a pair of side plates disposed at third and fourth opposing ends of the plurality of unit cells, the side plates arranged in a second direction crossing the first direction, wherein the side plates are connected to the end plates and the bus bar holder; and
a plurality of brackets spaced apart along the first direction in the bus bar holder;
wherein the bus bar holder includes a bracket that is made of a synthetic resin and extends in the second direction, and
wherein each of the side plates includes a connecting portion that is spaced apart along the first direction in the side plate so as to correspond to the brackets of the bus bar holder and is welded to the bodies of the brackets.

17. The rechargeable battery module of claim 16, wherein the connecting portion includes an elastic portion bent at a lower side of the connecting portion to have an elastic force toward the brackets.

* * * * *